Nov. 5, 1968   R. P. BROWN ET AL   3,409,196
FILM TRANSPORT CONTROL APPARATUS
Filed Dec. 3, 1965   2 Sheets-Sheet 1
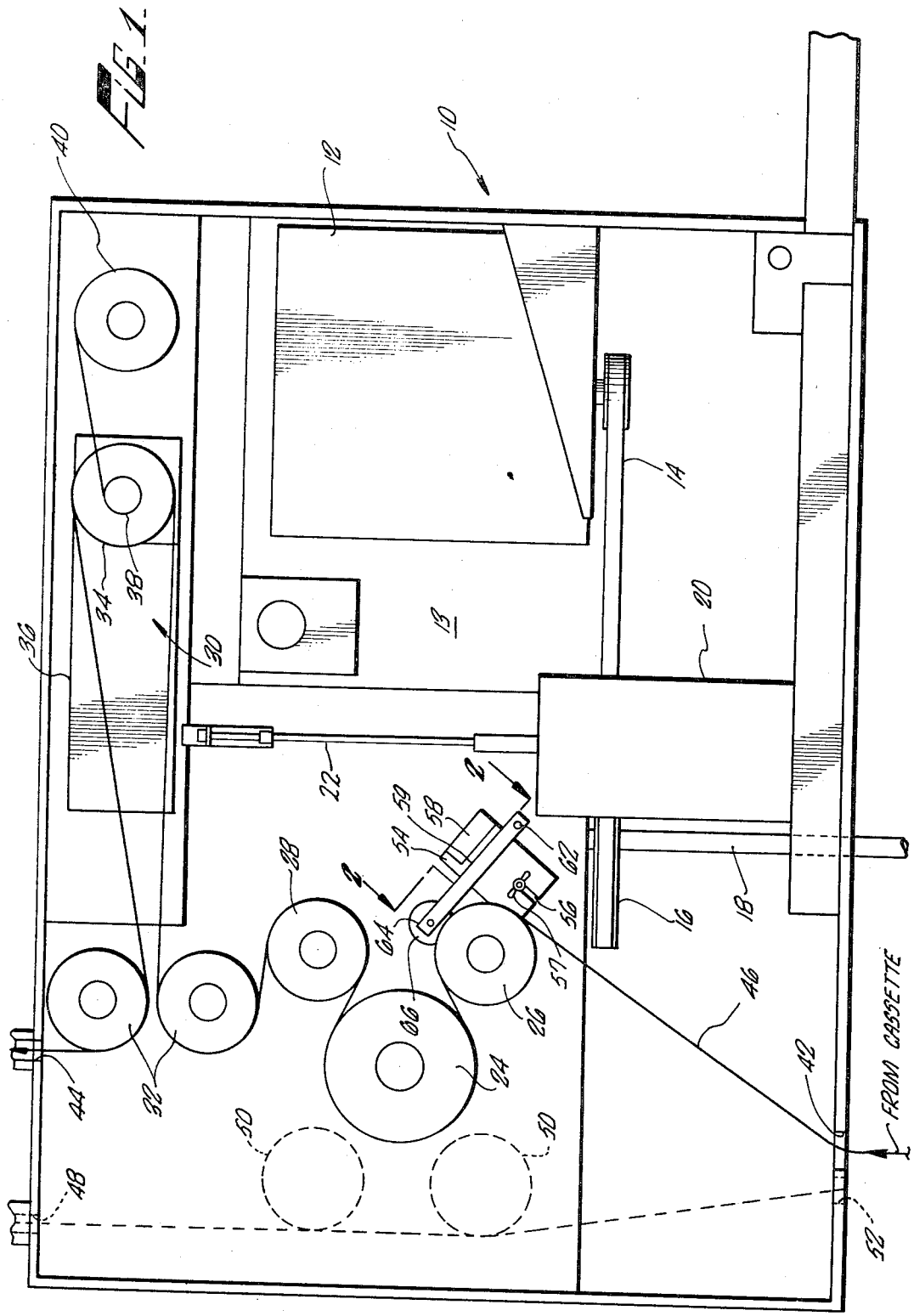

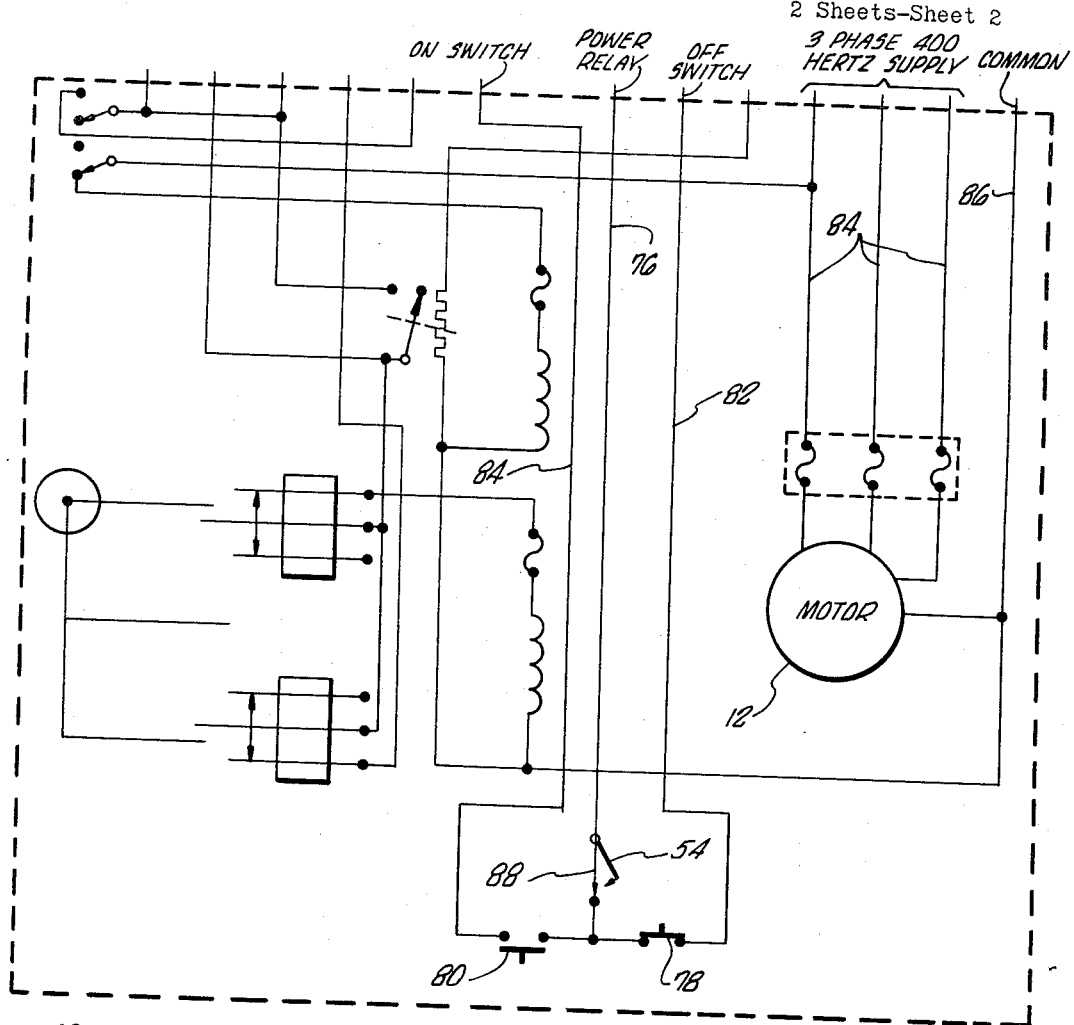
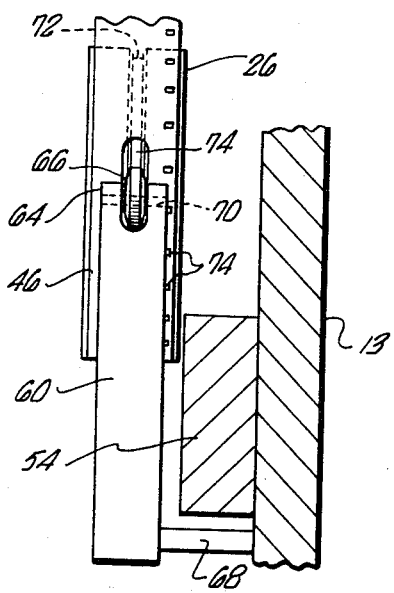
Fig. 3
Fig. 2
INVENTORS.
RICHARD P. BROWN
ARTHUR RAK
BY
Christie, Parker & Hale
ATTORNEYS.

United States Patent Office 3,409,196
Patented Nov. 5, 1968

3,409,196
FILM TRANSPORT CONTROL APPARATUS
Richard P. Brown, Monrovia, and Arthur Rak, Altadena, Calif., assignors to Consolidated Electrodynamics Corporation, Pasadena, Calif., a corporation of California
Filed Dec. 3, 1965, Ser. No. 511,501
5 Claims. (Cl. 226—11)

ABSTRACT OF THE DISCLOSURE

Apparatus for automatically controlling the operation of a motion picture film entertainment system. The system comprises a plurality of motion picture projectors and a single strand of film extending serially through the projectors. The apparatus provides, in combination, a drive motor, supply and take-up reels, a spring biased film looping mechanism and means for sensing a discontinunity in the film. Upon a change in film tension or occurrence of a discontinuity, the apparatus deenergizes the system to prevent further damage to the film and/or the overall system.

---

The invention relates to filament drive control mechanisms and in particular to apparatus for sensing the occurrence of a significant point in the course of a motion picture film presentation.

Apparatus for sensing the tension and/or the occurrence of a discontinuity in a moving filament are in common use in such areas as the magnetic tape transport art. In this area various means are employed for detecting the occurrence of a signficant point or points along the length of the filament, as for example, the end of the tape. Such apparatus also frequently embodies the capability of sensing the occurrence of a break in the filament.

Among the various methods used to accomplish these objectives are spring biased loop-forming mechanisms, photoelectric cells for detecting a transparency in the filament and various air pressure mechanisms for sensing the coincidence of a hole in the filament with a port in a vacuum or pressure column.

In this invention a control mechanism is provided for sensing a significant point along the length of a strand such as the end of a motion picture film. Additionally, the mechanism embodies the capability of sensing a discontinuity in the film such as a break. The present invention provides a control apparatus for a film transport having drive means for moving film between two points. The control apparatus includes a movable sensor adapted to contact a strand of film at a point along the transverse axis of the strand. An aperture is provided at a predetermined point in the strand in alignment with the point of contact of the sensor together with means interconnecting the sensor and film drive means. The interconnecting means are operable in response to movement of the sensor upon coincidence of the sensor and the aperture for stopping the strand drive means. The interconnecting means are preferably suitable switching and electrical circuitry means in operative engagement with the sensor for stilling or stopping the film drive to permit correction action and/or removal and reinsertion of a film reel.

In one embodiment the sensor is a pivotable arm mounted adjacent a motion picture film path in contact with a microswitch. The microswitch is in turn connected in an electrical circuit relationship with a source of electrical power and the film drive means. A contact is provided at the free end of the arm which is adapted to contact the film. When a discontinuity in the form of an elongated aperture in the film extending parallel to the longitudinal axis of the film reaches the contact on the pivotable arm, the contact is urged into the aperture. Movement of the arm operates the microswitch opening on electrical circuit between the power source and the drive means thereby stopping the film drive. In a preferred embodiment the film is passed over a guide roller provided with an annular indentation aligned with the contactor on the pivotable arm.

The end of film sensor of this invention will be more readily understood by reference to the following figures in which:

FIG. 1 is a diagrammatic elevational view of a motor drive unit for a motion picture film system which is provided with the end of film sensor of this invention;

FIG. 2 is a view taken along lines 2—2 of FIG. 1; and

FIG. 3 is a schematic depicting the electrical circuitry associated with the sensor.

Referring now to FIG. 1 there is shown a unit 10 referred to herein as a motor drive view which is suitable for use in association with a film magazine or cassette which is likewise described in more detail in second copending application Ser. No. 511,429 filed Dec. 3, 1965. The drive unit 10 provides means for driving the film supply and takeup reels used in the system. The unit is effectively divided into two parts, a first part corresponding to a supply portion of the unit and a second part to the takeup portion of the unit. FIG. 1 is concerned primarily with the apparatus located in the supply portion of the unit.

As shown therein, the unit includes a motor 12 connected by means of a drive belt 14 to a pulley 16. A shaft 18 mounted on the axis of pulley 16 extends from the motor drive unit to a point of connection (not shown) with a drive shaft in a film cassette. The cassette drive shaft drives film supply and takeup reels located therein. Energization of motor 12 causes rotation of pulley 16 and shaft 18 to thereby turn the reels when the drive train is connected therebetween.

A solenoid 20 is provided which is connected by means of an actuator arm 22 to a clutch (not shown) which is associated with a sprocket wheel 24. By suitable gearing means (not shown) shaft 18 is also connected to sprocket wheel 24 for driving this piece of apparatus.

A first guide roller 26 is located on the side of sprocket wheel 24 adjacent the cassette. A second guide roller 28 is located on the side of the sprocket opposite the first guide roller 26. Rollers 26 and 28 together define a portion of a film path such that the film contacts the sprocket 24 over a major portion of the circumference of the sprocket wheel.

Provided at the top of the motor drive unit is a film loop-forming means 30 together with two associated guide rollers 32 which define a suitable film path for enabling the use of the loop-forming means. This loop-forming means is similar to that used and described in copending application Ser. No. 485,768 filed Sept. 8, 1965, now U.S. Patent 3,379,488 and comprises a roller 34 mounted on a slider arm 36. Roller 34 is rotatably mounted on an axle 38 which is, in turn, mechanically linked to a constant tension torsion spring 40. In operation, film tension causes the slider arm 36 to be balanced intermediate two end positions against the tension provided by spring 40. As the loop length increases or decreases the slider arm 36 and roller 34 are caused to move laterally. If the lateral displacement of the combination toward the right hand side of unit 10 is sufficiently large, control apparatus is operated, energizing solenoid 20 and operating the clutch associated therewith disengaging the drive train to sprocket wheel 24. Excessive displacement in the left hand direction operates control apparatus in the first projector station in the entertainment system for stilling the transport mechanism in that station.

The motor drive unit is provided with an inlet aperture 42 for admitting film from the cassette and an outlet aperture 44 through which film passes as it moves from the unit to the first projector. The apertures, sprocket wheel and associated guide rollers and film loop-forming means and associated guide rollers in combination define a film path indicated by a length of film 46 extending through the motor drive unit from the inlet to the outlet aperture.

Certain other pieces of apparatus not pertinent to the present invention are provided on the takeup side of motor drive unit 10. For purposes of this discussion an indication of the film path on that side of the unit is all that is necessary. As shown therein, the film passes through an inlet aperture 48 from the last projector in the system past several guide rollers 50 to and through an outlet aperture 52. The film is then carried into the cassette and wound on the takeup reel.

Located adjacent guide roller 26 is the end of film sensor of the present invention. It comprises a base plate 54 which is mounted on an interior wall 13 of the motor drive unit 10. Plate 54 provided with an elongated aperture or slot 56 located at one side thereof and is secured in place by securing means such as a wing nut 57 or the like. Aperture 56 provides means for adjusting the location of the base plate 54 relative to the guide roller 26 and other elements of the end of film sensor. A microswitch 58 is mounted on base plate 54. An arm 60 which is pivoted at one end 62 and provided with a bifurcation at the opposite end 64 for receiving a rotatable wheel 66 is mounted transversely of base plate 54. The arm 60 and wheel 66 are disposed such that wheel 66 engages film 46 in rolling contact as the film advances through the motor drive unit. In operation, the film passing through the motor drive unit biases arm 60 such that some portion of the arm contacts an operating contact 59 of microswitch 58 and thereby provides continuity in a circuit supplying power to motor 12. As long as a continuous skein of film is passed underneath wheel 66 the arm is maintained in this biased orientation and the circuit remains closed.

The specific details of the end of film sensor are better illustrated in FIG. 2, a section view taken along lines 2—2 of FIG. 1. In this view the interior wall 13 of the motor drive unit is shown supporting base plate 54 and the arm 60 of the film sensor. Arm 60 is pivotally mounted on wall 13 by means of axle 68. Contact wheel 66 is mounted by means of a pin 70 extending through the bifurcated end 64 of arm 60. Guide roller 26 is provided with an annular indentation 72 along the periphery and approximately midway between the edges of the roller. The detent is located such that it is aligned with the point of contact of wheel 66.

Located between wheel 66 and guide roller 26 is a strand of film 46 having a plurality of sprocket holes 74 disposed along one side thereof. The wheel 66 on sensor arm 60 is shown in registration with a longitudinal aperture 74 which is placed in the film along the longitudinal axis of the film in alignment with the point of contact of wheel 66 and annular indentation 72. For positive action of the control apparatus of this invention the length of aperture 74 is chosen such that it is approximately three times the radius of the wheel 66. When registration occurs between sensor wheel 66 and aperture 74, arm 60 pivots about axle 68 and wheel 66 is urged into annular indentation 72. Movement of arm 60 operates the microswitch and cuts off power to the system.

A schematic of the electrical circuitry associated with the cassette is shown in FIG. 3. A more detailed description of a similar schematic is included in the aforementioned copending application Ser. No. 485,768 filed Sept. 8, 1965. The schematic is included here to show the specific electrical circuitry associated with the end of film sensor of this invention. In the copending application just referred to, a contemplated embodiment of the end of film sensor was a conductive strip disposed across the film which is adapted to close a circuit between two contacts thereby energizing relay and interrupting power to the system. In the present embodiment, a microswitch 58 is connected on one side to lead 76 which is in turn connected to a relay which controls contacts for connecting the system to a three-phase, 400 hertz power supply provided on board an aircraft. Connected to the other side of microswitch 54 are switches 78 and 80 which are in turn wired via leads 82 and 84, respectively, in parallel with an "off" and an "on" switch provided in a control panel located in the passenger compartment. The cassette and motor drive unit containing switches 78 and 80 is mounted in the pilot compartment. Provision of parallel control switches provides means for controlling the system in either compartment of the aircraft. Power is supplied to motors 12 over leads 84 with a common lead 86 providing the ground return.

As indicated previously, registration of an aperture in the film with sensor arm 60 causes operation of microswitch 54. Operation of switch 54 in turn opens a contact 88 interrupting the flow of current through the solenoid of a power relay (not shown) thereby disconnecting the three-phase power supply from the system. In addition to sensing the occurrence of a discontinuity in the form of an aperture in the film, the sensor of this invention is also useful in detecting a break in the film between the cassette and the sensor. As the point of the break passes between roller 26 and wheel 66, arm 60 pivots as wheel 66 is urged into the annular indentation 72 provided in guide roller 26 and power to the system is cut off as above.

The sensor is also useful in stopping the system at predetermined points in the course of a film presentation. For example, on relatively long flights, up to four hours of entertainment are provided with the system. In the four hours several short subjects bracketing a full length feature presentation may be provided. If it is deemed desirable to stop the presentation after the presentation of some of the short subjects and before the feature film is presented the control apparatus of this invention provides the function automatically. Likewise, an interruption between the end of the feature film and other shorts may be also desirable. If such interruptions are in order, a punch such as a streetcar conductor's punch can be used to place an aperture of desired length in the film at locations corresponding to the desired breaks to automatically stop the system as these points occur. This eliminates the need for attendants to stand by the controls and manually turn the system off.

What is claimed is:

1. A sensor for controlling the operation of a motion picture film transport system comprising:
    a film drive sprocket,
    means for driving the sprocket,
    a source of electrical power connected to the sprocket drive means,
    a length of film having a longitudinal aperture at a location corresponding to a significant point in a presentation recorded on the film,
    film loop-forming means associated with the sprocket drive, said loop-forming means being spring biased to apply tension to the film,
    guide means for directing the film around the film-looping means between a first guide roller and an exit from the film sensor,
    a guide roller for the film, the guide roller having a detent located along the periphery thereof intermediate the edges of the roller,
    a pivotally mounted arm disposed adjacent the guide roller,
    a rotatable wheel mounted on the arm and adapted to engage the film in rolling contact, the point of contact of the wheel being in alignment with the longitudinal aperture, and
    a switch connected in electrical circuit relationship with the source of electrical power and the sprocket drive means, the switch being in operative engagement with the pivotally mounted arm whereby the sprocket is driven until coincidence of the aperture and rotatable wheel causes operation of switch interrupting the electrical circuit from the source of power to the sprocket drive means.

2. Apparatus for controlling the movement of motion picture film between two points in an entertainment system comprising:

a strand of motion picture film;
a source of electrical power;
a film path through the apparatus including a station for supplying film and a film outlet aperture from the apparatus;
a drive motor;
means for electrically connecting the source of power to the drive motor;
film loop-forming means associated with the drive motor for dynamically storing a portion of the film strand in the path between the supply and outlet aperture;
a sprocket wheel located between the supply and outlet aperture for driving the film strand, the sprocket wheel being mechanically coupled to the drive motor;
a pair of guide rollers, each of said rollers being located on opposite sides of the sprocket wheel and positioned relative to the sprocket wheel such that the film strand passes around a major portion of the circumference of the sprocket wheel; and
a sensor located adjacent one of said guide rollers for detecting the occurrence of a discontinuity in the strand of film, the sensor being in operative engagement with the source of power whereby coincidence of the discontinuity in the film with the sensor opens the circuit between the source of power and the drive motor.

3. Apparatus according to claim 2 wherein the discontinuity in the film is an aperture disposed longitudinally of the film and the sensor is arranged such that it is energized upon coincidence of the aperture and sensor.

4. Apparatus according to claim 3 wherein the sensor is provided with a roller adapted to ride on the strand of film and the dimension of the aperture longitudinally of the film is three times the radius of the roller.

5. Apparatus according to claim 4 wherein the sensor is located adjacent one of said guide rollers and is angularly positionable relative thereto.

References Cited

UNITED STATES PATENTS

| | | | |
|---|---|---|---|
| 1,695,769 | 12/1928 | Mansfield | 226—43 |
| 2,246,969 | 6/1941 | Antrium | 226—43 X |
| 2,368,001 | 1/1945 | Cooper | 226—43 X |
| 2,369,290 | 2/1945 | Foard | 226—43 X |
| 3,049,598 | 8/1962 | Lannan | 226—43 X |

ALLEN N. KNOWLES, *Primary Examiner.*